Patented Oct. 16, 1928.

1,688,228

UNITED STATES PATENT OFFICE.

ALBERT BUSCH, OF BRUNSWICK, GERMANY, ASSIGNOR TO JOHANN A. VON WÜLFING, OF BERLIN, GERMANY.

PROCESS FOR MANUFACTURING ALBUMIN PREPARATIONS.

No Drawing.    Application filed December 18, 1924. Serial No. 756,841.

My present invention relates to albumin preparations and provides a process of manufacturing siliciferous albuminous matter which swells up with a small quantity of cold water, dissolves readily in a large quantity of hot water with a neutral reaction and contains in a dry state a certain and constant percentage of silicic acid and is non-hygroscopic.

In the therapy of silicic acid in cases of arteriosclerosis, carcinoma, phthisis and similar diseases metasilicate of sodium $Na_2SiO_3$ has proved to be of benefit inasmuch as it reaches the tissues of the lungs and deposits therein silicic acid, whereby further decay of this texture is prevented, as has been made manifest by many experiments.

Attempts have been made to replace metasilicate of sodium by other siliciferous substances, but these attempts appear not to have been successful.

Metasilicate of sodium, however, even in its purest form has its drawbacks which influence the administering of the same unfavorably. First of all, the salt is hygroscopic and absorbs moisture from the atmosphere; thus it is subject to agglomeration, and in a agglomerated condition it cannot be readily dispensed in small doses, which are necessary for medication. On the other hand, metasilicate of sodium dissociates when dissolved in water and is split up into caustic alkali which irritates the mucous membranes of the intestines and impairs resorption. Therefore, to avoid this dissociation, for practical use metasilicate of sodium used to be dissolved in soda water to produce bicarbonate of sodium from free alkali.

Generally speaking, metasilicate of sodium has proved to be very useful when made use of in cases of silicic acid therapy, and it has been proved experimentally (compare Zickgraf in "Beiträge zur Klinik der Tuberkulose", 1906, volume 5, page 399) that it circulates in and is resorbed and assimilated by all organs of the human body, while a part of it is excreted with the urine and the fæces.

The silicates of sodium now on the market (even the purest of them) contain more silicon dioxide than would correspond with the formula $Na_2SiO_3$. A particular sample of the so called "pure" salt, was found by analysis to contain 58% $SiO_2$, whereas it should theoretically contain only 49.1% $SiO_2$. This excess of 8.9% of $SiO_2$ generally requires 11.8% of NaOH, for its complete neutralization or complete conversion into $Na_2SiO_3$.

Now, I have discovered that the hygroscopicity of metasilicate of sodium and its noxious tendency to split off caustic soda which irritates the mucous membranes of the intestines, can be got rid of by combining the pure metasilicate of sodium, prepared for example, as described above with certain albuminoids of acid reaction, for instance, such as casein or albuminates of animal or vegetable origin, or similar albuminous matter. To obtain the compounds, mentioned above, I proceed as follows: I add to casein, for instance, milk-casein, in an aqueous suspension so much of metasilicate of sodium, produced as described before by saturation of the excess of $SiO_2$, that the casein is dissolved and the solution, when diluted with a great quantity of hot water, shows a neutral reaction on litmus paper. I remove from this solution the water by evaporating it at a low temperature, and preferably in vacuo. Thereafter, the residue is dried and ground to a fine powder, and may be passed through a sieve.

I may also proceed as follows:

I take pure casein, finely ground and free of fat, suspend it in highly concentrated ethyl alcohol and add a concentrated aqueous solution of so much pure metasilicate of sodium, prepared as described above as is required to produce a compound of casein and metasilicate of sodium, soluble in a large quantity of hot water and showing a neutral reaction on litmus paper. I have found that 100 parts by weight of casein require about 4 parts by weight of metasilicate of sodium $Na_2SiO_3$ to produce a compound according to my invention. This proportion may be used whether I produce the compound in presence of water or alcohol or any other indifferent organic solvent such as methyl alcohol, acetone, ether and so on.

As shown above, the process of manufacturing the preparation in question can be carried out in several ways. Particularly good results can be secured by proceeding as follows:

The albuminoids (albuminates, casein of milk, and vegetable casein which are used for the purpose), for instance, 100 parts by weight of casein in a pure state, free of fat and finely powdered, are mixed with 1000 parts by weight of cold water and to this suspension 4 parts by weight of metasilicate of sodium, dissolved in 15 parts by weight of water, are added while the mixture is being stirred up. When a small sample of this casein-solution, for instance, 2 cubic centimetres, dissolves in 20 to 30 cubic centimetres of hot water to a clear neutral liquid, the reaction is finished and the pasty mass is freed from water by evaporation in vacuo. The residue after being finely ground and sifted, appears as a white powder, is without smell and taste, absorbs cold water readily and dissolves in hot water turning the same into a milky liquor of neutral reaction on litmus paper.

I may as well obtain the compound of casein with metasilicate of sodium by mixing 100 parts by weight of pure casein, free of fat and finely ground, with 200 to 300 parts by weight of strong ethyl alcohol, and adding to this suspension about 4 parts by weight of metasilicate of sodium, prepared in a pure state and dissolved in about 15 parts by weight of water. When the suspension of casein is well mixed with the concentrated solution of metasilicate of sodium, the solvent, namely in the present case the ethyl alcohol, is removed by filtration and the residue is washed with some more alcohol and thereafter with ether, and finally the product is dried, first in the open air, and then by heat at a low temperature. The properties of the product, thus obtained, are the same as those of the product described above.

In the examples given above, instead of metasilicate of sodium, other silicates as, for instance, silicates of potassium, can be used. Instead of alkali metal-metasilicates, alkali metal-polysilicates may be used. In this latter case, for 100 parts by weight of casein less than 4 parts by weight of polysilicate of sodium should be used and so much carbonate of sodium or caustic soda should be added as corresponds to the percentage of silicon dioxide contained in a free state in the polysilicates.

Instead of casein and metasilicates of alkali metal, casein-sodium and alkali metal-polysilicates may be used. Ethyl alcohol may be replaced by other indifferent organic liquids e. g. methyl alcohol, acetone, ether, and similar organic liquids.

What I claim and desire to secure by Letters Patent of the United States is:

1. The process of manufacturing siliciferous albumin preparations which comprises treating an albuminoid of an acid character with such proportions of a silicate of an alkali metal substantially free from uncombined silicon dioxide in a liquid medium that an albuminous product with a substantially neutral reaction results.

2. The process of manufacturing siliciferous albumin preparations which comprises treating an albuminoid of an acid character with such proportions of a silicate of an alkali metal substantially free from uncombined silicon dioxide in an aqueous liquid medium that an albuminous product with a substantially neutral reaction results.

3. The process of manufacturing siliciferous albumin preparations which comprises treating an albuminoid of an acid character with a silicate of an alkali metal in the presence of an aqueous medium containing no other substance capable of reacting with or altering chemically the reaction product of said albuminous substance and said silicate, said silicate being present in such proportions that a substantially neutral product results.

4. The water soluble substantially neutral albuminous reaction product of casein and an alkali metal silicate.

5. The albuminous product resulting from interaction of an acid albuminoid with an alkali metal silicate which product is soluble in water, shows a substantially neutral reaction, which is normally white, without taste or smell, substantially non-hygroscopic, which swells in a small quantity of water and which is easily absorbed by the mucous membranes.

6. The albuminous product resulting from the interaction of an albuminoid of an acid character and a metasilicate of sodium free from excess of silicon dioxide which product is soluble in water, shows a substantially neutral reaction, which is normally white, without taste or smell, substantially non-hygroscopic, which swells in a small quantity of water, and which is easily absorbed by the mucous membranes.

7. The albuminous reaction product of casein with metasilicate of sodium, said product being soluble in water, showing a substantially neutral reaction, being normally white and devoid of taste or smell, being substantially non-hygroscopic but swelling when placed in a small quantity of water, and being easily absorbed by the mucous membranes.

In testimony whereof I affix my signature.

Dr. ALBERT BUSCH.